United States Patent
Sibley et al.

[11] 3,825,744
[45] July 23, 1974

[54] OVERSPEED DETECTOR FOR VEHICLE CONTROL SYSTEM

[75] Inventors: Henry C. Sibley, Adams Basin; John H. Auer, Jr., Fairport; Willis R. Smith, Rochester, all of N.Y.

[73] Assignee: General Signal Corporation, Rochester, N.Y.

[22] Filed: Mar. 26, 1973

[21] Appl. No.: 344,681

Related U.S. Application Data

[62] Division of Ser. No. 152,845, June 14, 1971, Pat. No. 3,748,466.

[52] U.S. Cl. ......... 246/182 C, 307/216, 340/248 P, 340/411
[51] Int. Cl. ...................... B60l 15/00, G08b 21/00
[58] Field of Search ........ 246/182 C, 182 R, 187 B; 340/409, 411, 248 P, 410; 317/5; 307/216

[56] References Cited
UNITED STATES PATENTS
2,719,911  10/1955  Maenpaa........................ 246/182 R

*Primary Examiner*—M. Henson Wood, Jr.
*Assistant Examiner*—George H. Libman
*Attorney, Agent, or Firm*—Milton E. Kleinman; Harold S. Wynn

[57] ABSTRACT

The Overspeed Detector for Vehicle Control Systems comprises a pair of high pass filters, having inputs governed by the actual vehicle speed signal, which deliver outputs only provided that the frequency of the inputs is above the frequency for the high pass filters, and the checking means includes an oscillator which generates a check signal with a frequency higher than the frequency of the high pass filters. The switching means alternately applies the check frequency to the inputs of the filters so that the filters alternately deliver output check frequency signals. Control means is governed jointly by outputs of the high pass filters and is operable to one state only when one of the filters at a time is delivering an output and operable to the other state when both filters deliver outputs contemporaneously.

3 Claims, 1 Drawing Figure

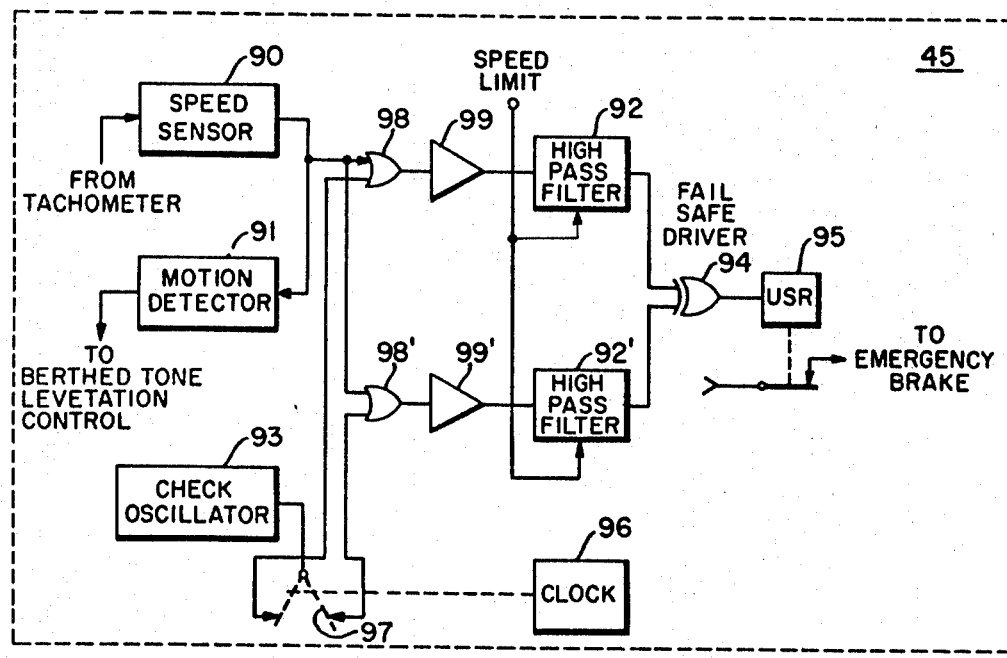

OVERSPEED DETECTOR FOR VEHICLE CONTROL SYSTEM

This is a division of application Ser. No. 152,845 filed 6-14-71 which has resulted in U.S. Pat. No. 3,748,466, issued July 24, 1973.

BACKGROUND OF INVENTION

This invention relates to overspeed detectors for vehicle control systems and in particular to such detectors for use in systems for controlling automatically the operation of a plurality of vehicles along guideways from centralized locations.

Operatorless automatic vehicle control systems require a number of safety and supervisory sub-systems for safe and efficient operation. Normally, an automatic vehicle protection system is necessary which must be substantially fail-safe in order to provide for safe public transportation. An automatic vehicle operation sub-system is included in order to provide the normal control of the vehicle within the restraints of the safety sub-system and a supervisory system is provided in order to provide such functions as, for example, performance monitoring, route control or other supervisory requirements.

It is therefore an object of the present invention to provide an arrangement which substantially obviates one or more of the limitations and disadvantages of the described prior arrangements.

It is another object of the present invention to provide a system which may effectively determine the position, direction and safe speed of an automatically controlled vehicle.

It is another object of the present invention to provide an improved system for communicating between the vehicle and the wayside for maintaining those communications in a safe manner.

SUMMARY OF INVENTION

Overspeed detection apparatus, according to a preferred embodiment of the present invention, comprising a pair of high pass filters having inputs governed by actual vehicle speed signals for delivering outputs of the respective filters in accordance with the actual speed limit inputs only provided that the frequency of the inputs is above the frequency of the high pass filters. Checking means is provided including an oscillator generating and check signal having a frequency higher than the frequency of the high pass filters and a switching means for alternately applying the check frequency to the inputs of the filters so that the filters alternately deliver output check frequency signals. The output means is governed jointly by the output of the high pass filters and is operable to one state or another only when one of the filters at a time is delivering an output, or operable to the other state when both filters deliver outputs contemporaneously.

For a better understanding of the present invention, together with other and further objects thereof, reference is had to the following description taken in connection with the accompanying drawing, while its scope will be pointed out in the appended claims.

With reference to the drawing, a schematic diagram discloses an overspeed and motion detector system as a preferred embodiment of the present invention.

DESCRIPTION OF THE PREFERRED EMBODIMENT

The function of the overspeed and motion detector 45 is to allow the vehicle V1 to proceed if its speed is below the authorized speed limit and to envoke irrevocable emergency stopping if the vehicle exceeds the limit or if any circuit in the overspeed and motion detector fails.

A speed sensor 90 generates a signal indicative of actual vehicle speed in accordance with signals from a tachometer which produces electrical pulses at a rate proportional to the speed of a notched wheel or gear in the vehicle propulsion system. The integrity of the speed sensor is checked by the motion detector circuit 91, which must indicate the motion of a fraction of a second after power is applied to the propulsion system. After the vehicle has stopped at a station, the same circuit must show no motion for a period of time before the doors are allowed to open.

Pulses from the speed sensor 90 occur at a frequency proportional to speed. These pulses after amplification and shaping are fed through a high-pass filter 92. The cutoff frequency of the filter 92 is selected by the speed limit signals received from the demodulator 43. If the vehicle is not overspeed, the speed sensor pulses 90 do not pass through the filter 92.

Because the blocks in the system are relatively short, that is, approximately 80 feet, and in some cases half that length, it is necessary to detect an overspeed condition substantially instantaneously. For this reason a check is installed in the overspeed and motion detector 45 for accomplishing this end. A check oscillator 93 produces a signal at a frequency corresponding to a simulated overspeeding vehicle. This signal is applied periodically to the high pass filter 92. If the vehicle V1 is not overspeed the filter 92 produces an output which is pulsed at the rate at which the check oscillator is applied to the filter. This pulsing output is applied to a fail-safe driver 94 which holds up the underspeed relay 95. If the vehicle is overspeed, however, the output of the filter 92 is steady state; that is, DC or no pulses. If the oscillator 93 fails or if the filter 92 fails, the output is zero or steady state, depending upon the vehicle speed. Speed comparison circuits are provided in duplicate with one circuit checking the vehicle speed while the other is undergoing a safety check. A clock 96 operates contact 97 for alternating the safety check between two circuits several times per second. The use of two circuits as shown, including the high pass filter 92', minimizes the response time of the overspeed and motion detector 45 because there is no dead time required by the safety check. The inputs to the circuit must alternate between two states continuously in order to keep the underspeed relay 95 energized. These two states are (1) one circuit showing an underspeed condition and second circuit showing an overspeed and (2) the second circuit showing underspeed and the first circuit showing overspeed. Failure to satisfy either one of these conditions releases the underspeed relay 95 immediately.

The sequence of events for the operation of the overspeed and motion detector 45 follows. Speed sensor pulses 90 are provided first to OR gate 98 and amplified at 99 for an input to the high-pass filter 92. If the vehicle is not overspeed the speed sensor pulses are not passed through the high-pass filter 92 to the fail-safe driver 95. However, at the same time that pulses are being introduced to the high-pass filter 92 check oscillator 93 has a contact 97 connected to the input of OR gate 98 for producing the simulated high speed vehicle signal so that the pulses from the check oscillator 93 are passed through the high-pass filter 92 and pulse the fail-safe relay driver 94 at a rate proportional to the simulated high speed vehicle. An input from the speed sensor 90 is also provided to OR gate 98' and amplified at 99' from high pass filter 92'. If the vechicle is not overspeed these pulses do not pass the high pass filter and that input for the fail-safe driver 94 is not energized. When the clock 96 switches contact 97 to the right the check oscillator 93 pulses are imposed on the input to OR gate 98' and passed through high pass filter 92' to the dirver 94 which the driver 94 sees as a proper input because its other input has been removed. As the clock 96 alternates the position of contact 97 signals are alternately produced on the two input leads of the driver 94 for maintaining the energized condition of the underspeed relay 95.

It should be noted that if the train stops the output of the speed sensor 90 indicates this condition to the motion detector 91 and also to the inputs of OR gates 98, 98'. However check oscillator 93 continues to produce pulses and clock 96 provides the switching necessary to produce alternate inputs on the fail-safe driver 94 for maintaining relay 95.

This system therefore provides continuous checking on the operablilty of the overspeed and motion detector 45 so that if an overspeed condition exists it will be detected without any substantial delay so that the vehicle can be brought to a safe stop as quickly as possible.

The Fail-Safe Driver 94 used in the preferred embodiment is an EXCLUSIVE OR circuit which, in order to produce a proper output for holding underspeed relay 95 energized, must receive one input only on one or the other input leads at a time. If the system is pulsing the input to the Driver 94 alternately and not simulataneously, the Driver 94 provides the output for holding relay 95 energized in accordance with the safe operation desired.

While there has been shown what at present is considered to be the preferred embodiment of the present invention, it would be obvious to those skilled in the art that changes and modifications may be made therein, without departing from the invention and it is therefore aimed in the appended claims to cover all such changes and modifications as fall within the true spirit and scope of the invention.

What is claimed is:

1. An overspeed detector for vehicle control system comprising sensing means for generating an alternating current actual speed signal for the vehicle and sensing means for delivering an alarm signal whenever the actual speed signal is indicative of a speed above a selected speed limit wherein the improvement comprises:
   a. a pair of high pass filters having inputs connected to the actual vehicle speed signal for delivering outputs of the respective filters only when the frequency of the inputs is above the cut off frequency for the high pass filters;
   b. checking means including an oscillator generating a check signal having a frequency higher than the cut off frequency of the high pass filters; and,
   c. switching means connected between said checking means and the input to each of said filters for alternately applying the check signal to the inputs of the filters, whereby the filters alternately deliver output check frequency signals, and
   d. control means governed jointly by the outputs of the high pass filters and operable to one state only when both filters at a time are delivering outputs alternately and operable to another state when both filters deliver outputs contemporaneously.

2. An overspeed detector according to claim 1 including said control means comprises:
   a. exclusive OR means having an input from each high pass filter for delivering a first output only when both filters alternately deliver output check frequency signals, and delivering another output when either filter delivers a steady-state signal, and b. underspeed relay means held energized by the first output by the exclusive OR means and de-energized by the other output.

3. An overspeed detector according to claim 1 wherein said switching means comprises:
   a clock for producing signals at a selected check rate, and contact means governed by the clock for alternately switching the oscillator output from one high pass filter input to the other in accordance with said check rate.

* * * * *